(12) United States Patent
Mayeur et al.

(10) Patent No.: US 11,804,743 B2
(45) Date of Patent: Oct. 31, 2023

(54) AXIAL-FLUX ROTOR WITH MAGNETS AND BODY MADE OF LAYERS OF COMPOSITE WITH FIBERS OF DIFFERENT ORIENTATIONS

(71) Applicant: Whylot SAS, Cambes (FR)

(72) Inventors: Loic Mayeur, Saint Santin (FR); Romain Ravaud, Labastide-Murat (FR)

(73) Assignee: Whylot SAS, Cambes (FR)

( * ) Notice: Subject to any disclaimer, the term of this patent is extended or adjusted under 35 U.S.C. 154(b) by 335 days.

(21) Appl. No.: 17/261,625

(22) PCT Filed: Sep. 23, 2019

(86) PCT No.: PCT/IB2019/058015
§ 371 (c)(1),
(2) Date: Jan. 20, 2021

(87) PCT Pub. No.: WO2020/065488
PCT Pub. Date: Apr. 2, 2020

(65) Prior Publication Data
US 2021/0265884 A1    Aug. 26, 2021

(30) Foreign Application Priority Data
Sep. 24, 2018   (FR) ..................... 18/01010

(51) Int. Cl.
*H02K 1/27* (2022.01)
*H02K 1/28* (2006.01)
(Continued)

(52) U.S. Cl.
CPC ............. *H02K 1/2795* (2022.01); *H02K 1/28* (2013.01); *H02K 21/24* (2013.01); *H02K 2213/03* (2013.01)

(58) Field of Classification Search
CPC ........ H02K 1/2795; H02K 1/28; H02K 21/24; H02K 2213/03; H02K 5/128; H02K 1/02
See application file for complete search history.

(56) References Cited

U.S. PATENT DOCUMENTS 5,021,698 A * 6/1991 Pullen .................. H02K 1/2796
                                                     310/112
5,982,074 A * 11/1999 Smith ...................... H02K 3/47
                                                     310/179
(Continued)

FOREIGN PATENT DOCUMENTS

DE    102010039123    2/2012
EP       0353042      1/1990
(Continued)

OTHER PUBLICATIONS

International Search Report from International Application No. PCT/IB2019/058015 dated Dec. 18, 2019.

*Primary Examiner* — Thomas Truong
(74) *Attorney, Agent, or Firm* — Crockett & Crockett, PC; K. David Crockett, Esq.; Niky Economy Syrengelas, Esq.

(57) ABSTRACT

A rotor (1) of an axial-flux electromagnetic machine having a body comprising an internal hub (2) concentric to the axis of rotation (7). Branches (3) extend radially in relation to the axis of rotation (7) from the internal hub (2) toward a binding band (8) which forms an external circular rim of the rotor (1). In each space defined between two adjacent branches (3) there is a magnet structure (10) comprising a plurality of magnets (4). The body is constituted by a plurality of stacked layers of composite containing fibers bonded by a resin. The fibers of each layer are oriented in a different predetermined direction (F1, F2) for two adjacent and stacked layers. In addition, a covering skin is located on each of two opposite faces of the rotor body, made up of a (Continued)

plurality of stacked layers of composite containing fibers bonded by a resin.

13 Claims, 4 Drawing Sheets

(51) Int. Cl.
*H02K 1/2795* (2022.01)
*H02K 21/24* (2006.01)

(56) References Cited

U.S. PATENT DOCUMENTS

2003/0141721 A1    7/2003  Bartlett
2016/0226353 A1*   8/2016  Court ................ B29C 45/14778

FOREIGN PATENT DOCUMENTS

FR          1475501              3/1967
FR          3014255              6/2015
FR          3014255 A1 *         6/2015   ............... H02K 1/28

* cited by examiner

AXIAL-FLUX ROTOR WITH MAGNETS AND BODY MADE OF LAYERS OF COMPOSITE WITH FIBERS OF DIFFERENT ORIENTATIONS

FIELD OF THE INVENTIONS

This invention relates to a rotor for an electromagnetic motor or generator with axial flux having a hub body and branches made of layers of composite with fibers in different orientations. The invention further relates to an electromagnetic motor or generator equipped with a rotor of this type.

BACKGROUND

This invention has an advantageous but not restrictive application for an electromagnetic motor that delivers high power at a high speed of rotation of the rotor, which is achieved by the specific characteristics of the rotor according to this invention. A motor of this type can be used, for example, as an electromagnetic motor in a fully electric or hybrid automotive vehicle.

Advantageously but not restrictively, the electromagnetic motor or generator can comprise at least one rotor framed by two stators, whereby these elements can be stacked on one another and separated by at least one air gap on a single shaft.

In high-speed applications it is necessary to have very high mechanical strength of the rotating part, i.e. the rotor, to improve the reliability of the system.

For an electromagnetic machine with axial flux the rotor comprises a body in the form of a disc-shaped support for magnets that has two circular faces connected by a thickness, the disc being delimited between an outer rim formed by a binding band and an inner periphery delimiting a cavity for a rotation shaft.

The magnets are each held in the disc-shaped support by holding means, an interval being left between the magnets.

The motors with axial flux are frequently used as motors having mass torques greater than those generated by motors with radial flux. They can therefore be used in low-speed applications.

For high-speed applications, the design of the rotor in a motor with axial flux is more complex because the forces due to centrifugal effects result in fairly high mechanical stresses in the rotor. In addition, the losses caused by Foucault currents become preponderant both in the magnets and in the rotating part when the latter is made of electrically conductive materials.

For a rotor that is required to rotate at high speeds of rotation, the principal disadvantage of a motor at a high speed of rotation resides in the high probability that the magnet or magnets will become detached from the rotor as well as the at least partial rupture of the rotor. The rotor of a motor of this type must therefore be capable of withstanding high speeds of rotation.

The prior art encourages the person having ordinary skill in the art to stiffen the disc-shaped support of the magnet or magnets to counter the centrifugal force. This requires a specific material for the disc-shaped support along with an increase in its thickness so that the disc-shaped support is more rigid.

This solution has not been entirely satisfactory because the motor or generator thus equipped with a disc-shaped support is both heavier and costs more to manufacture.

One solution can be to create mesh structures of elongated unitary magnets in fiber-reinforced and resin structures to reduce the Foucault currents and to use a body made of a composite material for the rotor that does not conduct electricity, ideally a rotor made of fiberglass, with a binding band placed on the periphery of the rotor to contain the forces due to centrifugal effects.

However, for applications in which the speeds become very high, the mechanical stresses become such that it is necessary to reduce the magnet mass to achieve these speeds of rotation. However, the torque that must be delivered by an electrical machine is proportional to the surface area of the magnets in interaction with the magnetic fields generated by the stators. A reduction of the magnetic surface area therefore entails a reduction of the torque and therefore of the power of the machine.

The problem addressed by the present invention is to design a rotor for the support of a plurality of permanent magnets equipped with a binding band for an electromagnetic machine with axial flux which can, on one hand, effectively hold the permanent magnets that the rotor supports, preventing the magnets from detaching from the rotor, while effectively compensating for the centrifugal force and, on the other hand, have a mechanical strength such that the rotor can rotate at very high speeds.

SUMMARY

For this purpose, the present invention relates to a rotor of an electfaromagnetic motor or generator having a body comprising an internal hub concentric to a central axis of rotation of the rotor, branches extending radially with respect to the central axis of rotation starting from the internal hub toward a binding band forming a circular external contour of the rotor, at least one magnet being housed in each space delimited between two adjacent branches, characterized in that:

the body is constituted by a plurality of stacked layers of composite containing fibers bonded by a resin, the fibers of each layer being oriented in a different predetermined direction for two stacked layers, a radial cover skin is located on each of two opposite faces of the rotor body, being constituted by a plurality of stacked composite layers containing fibers bonded by a resin.

The composite according to this invention contains no iron.

The configuration of the rotor according to the present invention is based on the finding that the maximum stresses applied to a rotor at very high speed occur at the level of the hub surrounding the median axis of rotation of the rotor. It is therefore necessary to solidify this internal portion of the rotor.

The applicant has found that the stacking of composite layers, each having a unique predetermined orientation direction with different orientation directions for each layer, stiffens the body and the rotor. It is not equivalent to having a single layer of composite with fibers that run in two different directions, which would be more difficult to manufacture because fibers in two different directions in the same layer can be displaced during the injection of a binder such as resin.

For applications where linear velocities become very high, typically starting at 160 meters per second or 180 meters per second, the mechanical stresses become such that it is necessary to reduce the magnetic mass to achieve these speeds of rotation. This has the major disadvantage that the torque that must be supplied by an electrical machine is proportional to the surface area of magnets in interaction with the magnetic fields produced by the stators. A reduction of the surface area of magnets therefore results in a reduction of the torque and therefore of the power of the machine.

According to the invention, the body makes the hub and the branches a single piece. This increases the mechanical strength of the assembly and consequently of the rotor.

The cover skins or discs are located on each circular face of the rotor. The binding band can be made of fiberglass, carbon or carbon fibers. The composite binding band circumferentially surrounds the large magnets or the magnet structures on an exterior periphery of the rotor. The binding band contributes, if necessary, to the radial hold of the magnets in addition to the hold guaranteed by the external layer of composite coating.

The fibers of a composite layer of the body are advantageously oriented perpendicular to the fibers of an adjacent stacked composite layer.

Advantageously, the fibers of a composite layer of the body are oriented at an offset of 30° to 45° with respect to the fibers of an adjacent stacked composite layer.

Advantageously, the number of layers of composite of the body is determined on the basis of an axial thickness of the magnet or the magnet structure and the cover skins, which have a thickness between 0.3 and 2 mm.

Each branch advantageously has a width that decreases with the distance from the internal hub, ending in a tapered tip against the binding. The tapered tips of the branch can optionally be attached to the binding band.

The applicant has taken into consideration the fact that, in the case of an axial flux machine, the torque is proportional to the cube of the radius of the rotor. Consequently, it is better to increase the surface area of magnets on the periphery of the rotor than in the more internal portions of the rotor. Therefore an absence of a magnet in proximity to the axis of rotation can be easily offset by an addition of magnets on the periphery of the rotor, which can be achieved by configurations of branches whose width decreases with the distance from the center of the rotor until they are only tapered tips with a width close to zero.

It is therefore desirable to increase the surface area of the cross-section of the branches of the rotor at the level of their connection with the hub and to gradually reduce this cross-section to increase the cross-section of the surface areas of magnets to maintain a significant motor torque.

That was never envisaged by the prior art, which used only branches of a constant thickness and hubs with a small radius to leave space for magnets. Therefore there was a strong bias toward reducing the distribution of magnets on the rotor to increase the mechanical strength of the rotor and the prior art was oriented toward other solutions such as an increase in the axial direction of the branches and of the hub, which would increase the weight of the rotor without having a major beneficial effect on its strength.

The bases of two adjacent branches are advantageously separated by an intermediate portion of the internal hub, the intermediate portion having a concave shape rounded in the direction of the axis of the rotor, the internal hub having a radius equal to or less than one-quarter of a radius of the rotor.

The curvature toward the interior of the intermediate portions between branches makes it possible to reduce the mechanical stresses at the level of the thickest cross-section of the branches that are supported on the external periphery of the hub.

Each magnet or magnet structure advantageously has a width that increases with the distance from the internal hub, ending against the binding band surrounding the rotor.

The magnet structure advantageously comprises a plurality of unitary magnets, each unitary magnet of the plurality of unitary magnets having a polygon shape or each unitary magnet having an at least partly ovoid contour comprising a first portion forming the body of the unitary magnet having a larger cross-section and extending over a greater width of the unitary magnet than at least one second longitudinal end portion pointing toward an associated longitudinal extremity of the magnet and decreasing as it approaches the longitudinal extremity.

Each magnet structure is advantageously constituted by a plurality of unitary magnets connected together by a fiber-reinforced insulating material, each unitary magnet having an elongated shape and extending in the axial direction of the rotor.

The above applies principally for the use of cover skins. The large magnets used for the rotor in the prior art dissipate a large quantity of heat. This dissipation made it impossible to use axial holding means in the form of cover skins or discs made of composite and the dissipation of heat could have consequences on the integrity of the coating, resulting in the accelerated aging of this coating as well as of the magnets.

The composite cover discs 12 were not frequently used in the prior art because they were unable to withstand the dissipation of heat generated by the magnets.

Because the present invention preferably utilizes a multitude of unitary magnets replacing a compact magnet of the prior art, the dissipation of heat is less and the cover skins or discs can be used as axial holding means, these skins or discs advantageously replacing axial holding means between the magnets and rotor body, which in some cases require modifications to the magnets or their coating to realize additional fastenings with the fastening means carried by the rotor.

A further synergy achieved by the present invention is that the rotor can have, between each branch, unitary magnets grouped into a magnet structure. Each three-dimensional magnet structure is constituted by a plurality of unitary magnets.

This makes it possible to have a magnet structure having a plurality of unitary magnets. It has been determined that a structure with such a plurality of unitary magnets has a high level of insensitivity to spatial harmonics or currents generated by the stator windings. Consequently, the losses generated in the magnet structures are very low and the output, in particular at high speed, is very high. A magnet structure of this type can form a magnetic pole or can be a complete magnet.

One of the preferred measures of the present invention is to break down a magnet structure that can be a whole magnet or a magnetic pole as in the prior art into a plurality of small or micro-magnets. A large magnet is subject to losses by Foucault currents to a greater extent than its equivalent in small or micro-magnets. The utilization of small magnets or micro-magnets therefore makes it possible to reduce these losses which are prejudicial to the operation of the electromagnetic actuator.

It is known that, to obtain a magnetic field of optimal intensity, the ideal volume of a magnet should approach that of a cube or cylinder whose length is equal to its diameter. It is common knowledge that increasing the length of a magnet beyond that does not achieve any increase in the magnetic field. However, the approach taken by the present invention in this preferred form runs counter to this accepted idea.

The length of the unitary magnet is significantly longer than the diameter or a diagonal of its flat longitudinal surface than recommended by widespread current practice, essentially to respond to requirements for the mechanical strength of the structure, which is the principal object of the present invention.

The applicant has discovered that a plurality of unitary magnets in a magnet structure results in a magnet structure that has a mechanical strength that is much greater while retaining magnetic properties that are practically similar to those of a single magnet having a surface area equal to n times the elementary surface area of the n magnets when there are n unitary magnets.

The ovoid magnets can have facets. The unitary magnets thereby obtained are "crystals" associated with one another which are not connected over the entire surface of their facets or longitudinal faces, but layers of resin and adhesive are used to construct a mesh network on the extremities of the poly-faceted blocks with limited areas of contact between magnets.

Alternatively, for unitary magnets having a perfectly ovoid shape with the rounded first portion, the contact between two adjacent unitary magnets is smaller and can be only spot contact, and corresponds essentially to a small circular arc between the two unitary magnets. A groove can be hollowed out that is the size of the circular arc of contact between two adjacent unitary magnets to receive the adhesive, which is advantageously in the form of resin.

Advantageously, the plurality of unitary magnets of a magnet structure are connected together by a fiber-reinforced insulating material, each unitary magnet having an elongated shape and extending in the radial direction of the rotor.

Each magnet structure advantageously includes at least one mesh structure that has cells, each of which delimits a housing for a respective unitary magnet, each housing having internal dimensions that are just sufficient to allow the introduction of a unitary magnet into its interior, while leaving a space between the housing and the unitary magnet which is filled by a fiber-reinforced resin, the mesh structures being made of fiber-reinforced insulating material.

The mesh structure remains in place and can also be coated with a layer of composite material. A mesh structure of this type makes it possible to hold the unitary magnets in place during the fabrication of the magnet structure and has the advantage that it represents an additional solidification element of the magnet structure, whereby the mesh structure can also contain reinforcement fibers.

For example, a honeycomb mesh structure is known to increase the strength of an element, in this case a magnet structure. The unitary magnets are inserted into the hexagonal housings that hold them in place. The walls of the housings act as electrical insulation and the density of the housings in the magnet structure can be significantly increased. The honeycomb mesh structure can be made of fiber-reinforced insulating composite material.

Each magnet or magnet structure between two adjacent branches is advantageously embedded in at least one layer of composite, whereby the rotor is also coated in a layer of composite that surrounds the embedded magnet structures in the body constituted by a plurality of layers of composite.

The composite layers surrounding the rotor and constituting the hub and the branches of the body are advantageously made of glass or carbon fibers cast in the resin. These reinforcement fibers contribute to increasing the strength of the magnet structure and in particular the flexural rigidity and resistance to buckling.

The invention further relates to a method for the fabrication of a rotor of this type, which comprises the following steps:
  casting of a first layer of composite containing fibers bonded by a resin, the fibers of the first layer being oriented in a single predetermined direction,
  casting of at least one second layer of composite containing fibers bonded by a resin, the fibers of the second layer being oriented in a predetermined direction different from the direction of the first layer,
  hardening of the resin.

This method is easy to carry out and preserves the orientation of the fibers more easily than if there were different orientations in each layer of composite.

The width of each branch of the body of the hub at a point in its length extending radially from the external periphery of the hub to the internal periphery of the binding band is advantageously determined on the basis of an evaluation of an allowable mechanical stress likely to be applied to the rotor, a maximum allowable speed of rotation of the rotor and a mechanical strength of the material of the branch, a decrease of the width of each branch with the distance from the hub being obtained by selecting for each branch a width for each point along its length that makes it possible to achieve iso-stress in the interior of the branch.

Without being restrictive, the maximum stress exerted on a branch toward its extremity connected to the hub can be estimated at 120 mega Pascals. The achievement of this iso-stress makes it possible to minimize the width of the branch and therefore to more effectively utilize the surface area of large magnets or magnet structures, therefore in this latter case more unitary magnets, which makes it possible to achieve greater torque and to additionally compensate for the loss of magnet surface area toward the hub.

Finally, the invention relates to an electromagnetic motor or generator with axial flux characterized in that it comprises at least one rotor of the type described above, the electromagnetic motor or generator comprising at least one stator carrying at least one coil, the electromagnetic motor or generator comprising one or more air gaps between the at least one rotor and the at least one stator.

BRIEF DESCRIPTION OF THE DRAWINGS

Other characteristics, objects and advantages of the present invention are explained in greater detail below and with reference to the accompanying drawings, which are provided by way of illustrating nonrestrictive examples, and in which:

FIG. 4 is an enlarged schematic representation of a portion of the rotor illustrated in FIG. 3, FIGS. 5a, 5b and 5c are schematic representations, FIGS. 5a and 5b corresponding to a respective embodiment of a unitary magnet having an ovoid shape, and FIG. 5c corresponding to a magnet structure comprising ovoid unitary magnets, for ovoid unitary magnets being shown separated from the magnet structure.

DETAILED DESCRIPTION

The figures are provided by way of example and are in no way restrictive of the invention. They constitute schematic illustrations intended to facilitate understanding of the invention and are not necessarily drawings to scale of practical applications. In particular, the dimensions of the different parts are not representative of reality.

In the following text, a single branch 3, a single base 3a and a single tapered tip 3b of the branch 3 are representative of all the branches in FIGS. 1 to 4. The same is true for a single magnet structure identified as 10 with inner surfaces 10a and outer surfaces 10b, an intermediate portion 9 between two branches for all the intermediate portions and a single fiber orientation F1 or F2 for each layer of composite in FIGS. 2 and 4. In FIGS. 1 to 4, a single unitary magnet 4 is identified and represents all the unitary magnets in a magnet structure 10.

Everything that is stated with regard to one of these individually identified elements applies to all similar elements not identified individually.

With reference to all the figures and in particular to FIGS. 1 to 4, these figures show respectively a rotor 1 and an enlarged illustration of a portion of a rotor 1 according to the present invention with two branches 3 with, interposed between them, a magnet structure 10 composed of a plurality of polygon-shaped unitary magnets 4.

Figure 2:
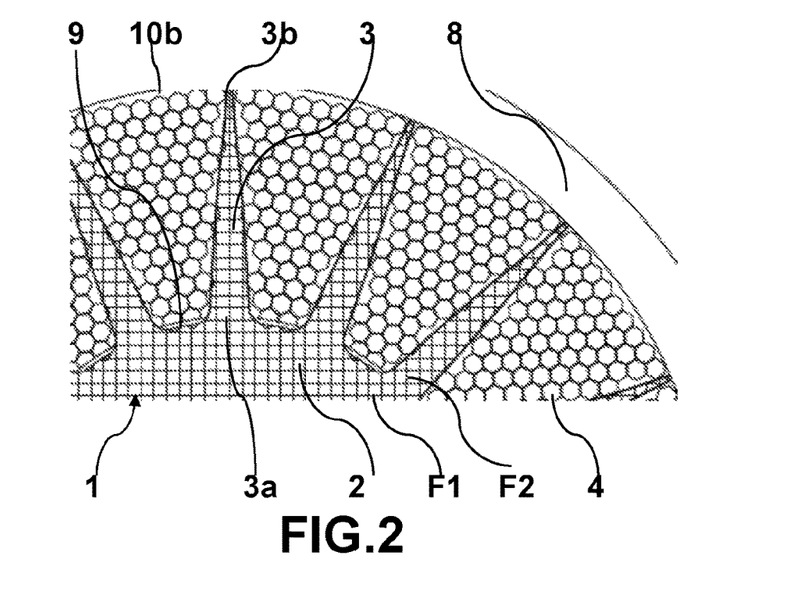
FIG. 2 is an enlarged schematic representation of a portion of the rotor illustrated in FIG. 1.
Figure 4:
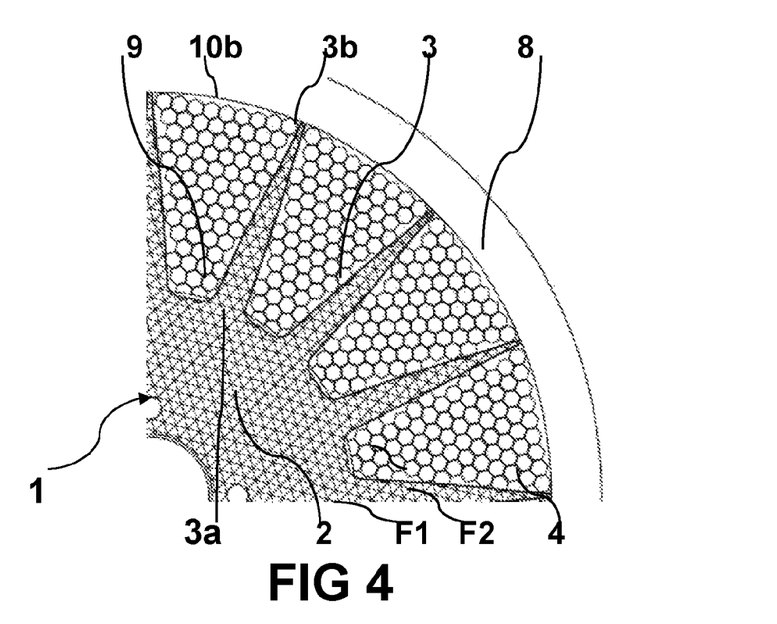

This embodiment is not restrictive and a single large magnet can be inserted between two branches 3, whereby the single large magnet must not be confused with the unitary magnets 4 of a magnet structure 10 that are visible and identified in FIGS. 2 and 4.

A rotor one of this type can be used in an electromagnetic motor or generator, advantageously with axial flux. The rotor 1, which is advantageously circular, has a body comprising an internal hub 2 which is concentric to a central axis of rotation 7 of the rotor 1 or the longitudinal median axis of the rotor 1. Branches 3 extend radially in the rotor 1 in relation to the central axis of rotation 7 starting from the internal hub 2 toward a binding band 8 that forms a circular outer contour of the rotor 1.

The hub 2 and the branches 3 are in one piece and form a rotor body 2, 3. At least one magnet, i.e. a large magnet or a magnet structure 10 comprising a plurality of small unitary magnets 4, is housed in each space delimited between two adjacent branches 3.

According to the present invention, the body 2, 3 is constituted by a plurality of stacked composite layers containing fibers bonded by a resin, the fibers of each layer being oriented in a predetermined direction F1, F2 which is different for two stacked layers.

Figure 5A:
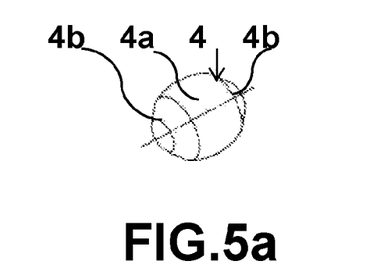
Figure 5B:
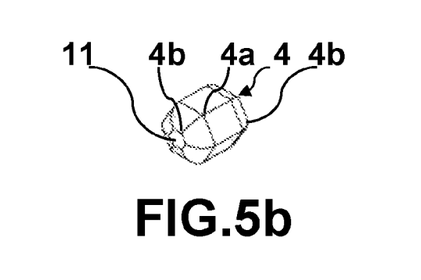
Figure 5C:
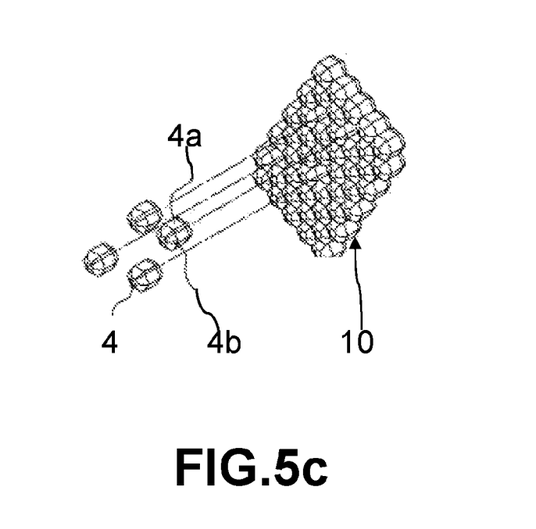
Figure 6:
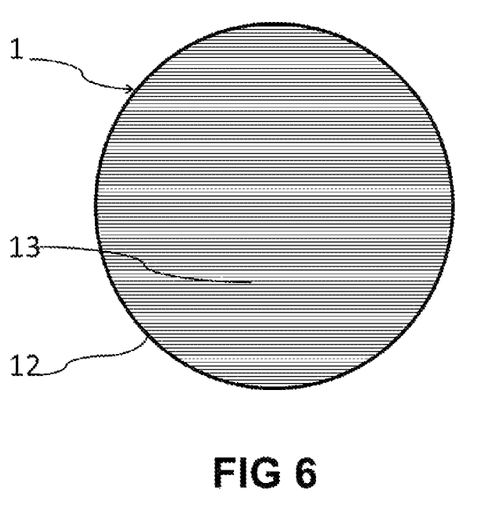
FIG. 6 is a schematic representation of a radial cover skin located on each of two opposite faces of the rotor body being constituted by a plurality of stacked composite layers containing fibers bonded by a resin.

As represented in FIG. 6, a cover disc 12 or skin, not shown in FIGS. 1 to 5 because it radially covers a circular surface of the rotor 1, is located on each of the two opposite faces of the body 2, 3 of the rotor, being constituted by a plurality of stacked composite layers containing fibers 13 bonded by a resin. The cover skins 12 or discs can be located on each circular face of the rotor 1 to prevent an axial movement of the magnet structures 10 or of the large magnets between two branches 3.

All these characteristics considered in combination significantly stiffen the body 2, 3 of the rotor 1.

Several embodiments of the composite layers can be envisaged. Non-restricting examples will now be described below.

Figure 1:
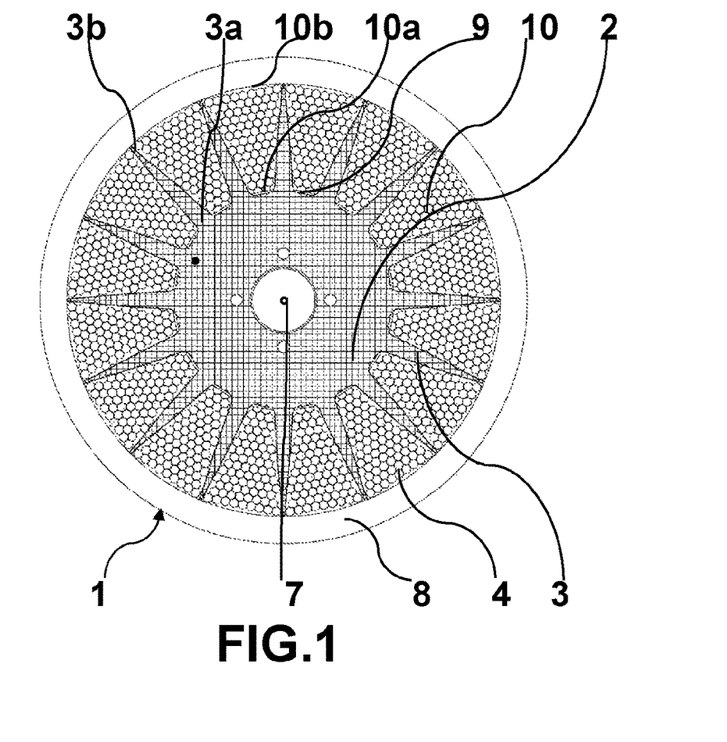
FIG. 1 is a schematic head-on view of a rotor intended for an electromagnetic machine with axial flux according to a first embodiment of the present invention, a body that includes the hub and the branches of the rotor being constituted by layers of composite each with orientations of the fibers in two different layers differing by 90°.

As illustrated in FIGS. 1 and 2, the fibers of a composite layer of the body 2, 3 can be oriented perpendicular to the fibers of an adjacent stacked composite layer, the directions F1 and F2 shown in FIG. 2 being perpendicular.

Figure 3:
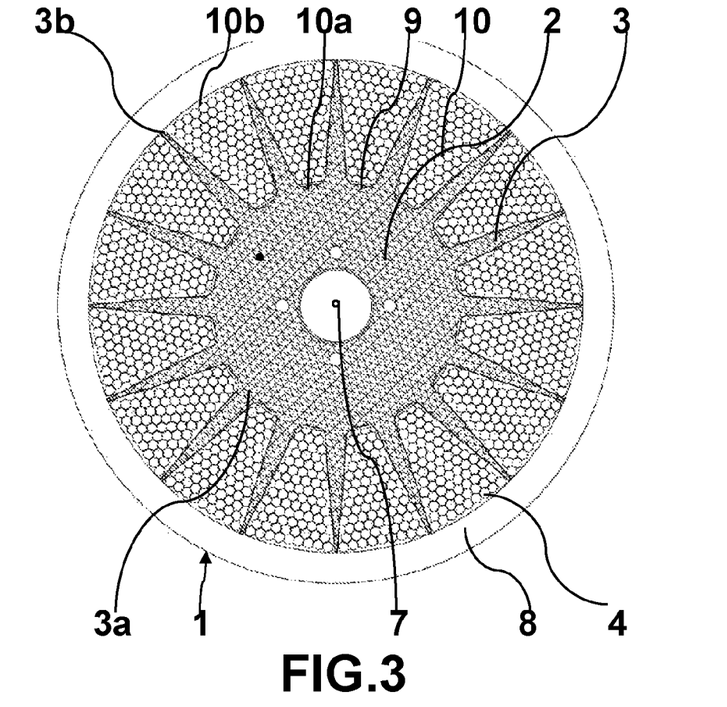
FIG. 3 is a schematic representation of a head-on view of a rotor intended for an electromagnetic machine with axial flux in a first embodiment of the present invention, a body that includes the hub and the branches of the rotor being constituted by layers of composite each with orientations of the fibers in two different layers differing by 90°.

As illustrated in FIGS. 3 and 4, fibers of a composite layer of the body 2, 3 are oriented at an offset of 30° to 45° with respect to the fibers of an adjacent stacked composite layer, in these figures 30°.

There can be more than two stacked composite layers. The number of composite layers of the body 2, 3 is determined on the basis of an axial thickness of the magnet or of the magnet structure 10 and the covering skins 12 have a thickness between 0.3 and 2 mm.

As best illustrated in FIGS. 1 and 3, each branch 3 can have a width that decreases with the distance from the internal hub 2 and ends in a tapered tip 3b against the binding band 8.

Each large magnet or magnet structure 10 can have a width 1a that increases with the distance from the internal hub 2 and ends against the binding band 8 surrounding the rotor 1.

The space lost for the magnets by increasing the width of the branches 3 toward their extremity or base portion 3a facing the hub 2 and, if appropriate, also as a result of increasing the radius of the hub 2, is made up on the peripheral end portions of the rotor 1.

The placement of each large magnet or magnet structure 10 with its greatest width 1a oriented toward the outer periphery of the rotor 1 makes it possible to increase the magnet portions located on the periphery of the rotor 1 and therefore to increase the total magnetized surface area.

Still with reference to FIGS. 1 and 3 in particular, the tapered tip 3b of each branch 3 can be at least from two to four times narrower than a base 3a of the branch 3 connected to the internal hub 2.

The bases 3a of two adjacent branches 3 can be separated by an intermediate portion 9 of the internal hub 2. This intermediate portion 9 can have a concave shape rounded toward the axis of the rotor 1. The internal hub 2 can have a radius equal to at least one-quarter of a radius of the rotor 1, which in fact results in a hub 2 larger than a hub 2 of the prior art. The radius of the rotor is equal to the radius of a branch 3 plus the thickness of the binding band 8.

The hub 2 and the branches 3 can be made of glass or carbon fibers cast in resin. Strong plastic fibers can also be used to increase the strength of the rotor 1 and in particular the flexural strength and resistance to buckling.

As mentioned above, to solidify the rotor 1, the hub 2 and the branches 3 are a single piece forming the composite body with fibers of different orientations F1, F2 according to the layer of composite in which they are contained. The branches 3 can optionally be connected to the binding band 8 by their tapered extremity 3b.

With reference in particular to FIGS. 1, 3 and 5a to 5c, each magnet structure 10 can be constituted by a plurality of unitary magnets 4 joined together by a fiber-reinforced insulating material, each unitary magnet 4 having an elongated shape and extending in the axial direction of the rotor 1. The unitary magnets 4, only one of which is identified in the figure, must not be confused with magnet structures 10 or with large magnets which are not shown in the accompanying figures.

It follows that each magnet structure 10 can be in three dimensions and constituted by a plurality of unitary magnets 4.

In FIGS. 1 to 4, each unitary magnet 4 of the plurality of unitary magnets 4 is in the shape of a polygon.

In FIGS. 5a, 5b and 5c, each unitary magnet 4 can have at least a partly ovoid contour, comprising a first portion 4a forming the body of the unitary magnet 4 having a larger cross-section and extending over a greater length of the unitary magnet 4 than at least one second longitudinal extremity portion 4b pointing toward an associated longitudinal extremity of the unitary magnet 4, the cross-section of which decreases as it approaches the longitudinal extremity.

In FIG. 5a, the unitary magnet 4 has an almost perfect ovoid shape with a first portion 4a and two rounded second end portions 4b with a convex shape. As can be seen in FIG. 5c, the contact between two adjacent and ovoid unitary magnets 4 is essentially spot contact or extends along a limited circular arc.

In this case, the unitary magnet 4 can have an exterior contour which is at least partly ovoid, with the first portion 4a forming the body of the unitary magnet 4 having a larger cross-section and extending over a greater length of the unitary magnet 4 than the at least one second portion 4b.

In FIG. 5b, the unitary magnet 4 can have at least one second portion 4b on at least one longitudinal extremity of the unitary magnet 4 as an extension of the first portion 4a. There can be two second portions 4b, with a second portion 4b respectively on one longitudinal extremity of the unitary magnet 4.

The second portion or portions 4b can point toward an associated longitudinal extremity of the magnet with a smaller cross-section approaching the longitudinal extremity.

As illustrated in FIG. 5b, the second longitudinal extremity portion or portions 4b can be dished or can have a convex shape. The second longitudinal end portion or portions 4b can end on their associated longitudinal extremity in a median facet 11 forming the longitudinal extremity. In FIG. 5b, for the ovoid shape, however, this median facet 11 forming the longitudinal extremity is dished and only optional.

In this FIG. 5b, the second longitudinal end portion or portions 4b can comprise lateral facets inclined toward a longitudinal axis of the unitary magnet 4 approaching the associated longitudinal extremity of the unitary magnet 4.

As illustrated in FIG. 5c, in a magnet structure 10, the unitary magnets 4 are directly adjacent to one another and are in partial contact. Unitary magnets 4 are adhesively connected by a deposit of adhesive. The plurality of unitary magnets 4 creates a mesh structure of magnets without the interposition of retaining elements between one another other than the adhesive, the unitary magnets 4 being in direct contact between adjacent magnets. The first portion 4a and the second portion 4b for unitary magnet are also shown in this FIG. 5c.

In FIGS. 2 and 4, the unitary magnets 4 can be adhesively connected to one another without a mesh structure between them. The same is true for FIG. 5c. The adhesive can be a layer of composite, or an adhesive resin, advantageously thermosetting or thermoplastic.

Each large magnet or magnet structure 10 between two adjacent branches 3 can also be embedded in a layer of composite. The rotor can also be coated in its entirety in a layer of composite.

There can therefore be a stack of at least a first layer of composite surrounding the unitary magnets 4, at least a second layer of composite to individually surround the magnet structures 10, and at least a third layer of composite to coat the rotor 1, in the knowledge that the body 2, 3 comprising the hub 2 and the branches of the rotor is also constituted of stacked layers of composite with fibers of different orientations depending on the layer.

As not shown in the figures but serving as references that have already been identified in the figures for similar elements, each magnet structure 10 can include at least one mesh structure having mesh cells, each delimiting a housing for a respective unitary magnet 4. Each housing can have internal dimensions that are just sufficient to allow the introduction of a unitary magnet 4 into its interior while leaving space between the housing and the unitary magnet 4 filled by a fiber-reinforced resin, the mesh cells being made of fiber-reinforced insulating material.

The binding band 8 can be made of fiberglass or carbon or carbon fibers. The composite binding band 8 circumferentially surrounds the magnet structures 10 or the large magnets on an external periphery of the rotor 1. The binding band 8 contributes, if necessary, to the radial hold of the magnet structures 10 or of the large magnets in addition to the hold guaranteed by the external layer of composite coating. The tapered tips 5d of the branches 3 can optionally be connected to the binding band 8.

This invention relates to a method for the fabrication of a rotor 1, with the following steps for the fabrication of its body 2, 3 comprising a hub 2 and branches 3.

The first step is a casting of a first layer of composite containing fibers bonded by a resin, the fibers of the first layer being oriented in a single predetermined direction F1.

The second step is a casting of at least one second layer of composite containing fibers bonded by a resin, the fibers of the second layer being oriented in a predetermined direction F2 different from the direction F1 of the first layer.

The third step is the hardening of the resin.

The body 2, 3 is then ready for use to form the skeleton of the rotor 1.

Advantageously, the invention further relates to a method for the fabrication of a rotor 1 of this type, in which the width 1 of each branch 3 at a point along its length extending radially from the external periphery of the hub 2 to the internal periphery of the binding band 8 at a known distance from the central axis 7 of rotation of the rotor 1 is determined on the basis of an evaluation of an allowable mechanical stress that can be applied to the rotor 1, a maximum allowable speed of rotation of the rotor 1 and a mechanical strength of the material of the branch.

A decrease in the width of each branch 3 as the distance from the hub 2 increases is obtained by selecting for each branch 3 a width for each point along its length that makes it possible to obtain an iso-stress in the interior of the branch 3.

FIGS. 1 and 3 show that the width of the branches 3 decreases as the radius increases, and therefore as the distance from the central axis 7 of the rotor 1 increases.

Advantageously, the width of each branch at a point along its length extending radially is given by the following equation:

$$l(r) = K\frac{\rho}{\sigma m}\theta W^2 r^2$$

where K is a constant that varies according to a thickness of the binding band and is representative of the mechanical strength of the material of the branch, p is a density of the magnet structure, Gm is the allowable mechanical stress likely to be applied to the rotor 1 and consequently to the branch, θ is an angle of aperture of each magnet structure and W is the allowable maximum speed of rotation of the rotor 1.

Finally, the invention relates to an electromagnetic motor or generator with axial flux comprising at least one rotor 1 as described above, the electromagnetic motor or generator comprising at least one stator carrying at least one coil, the electromagnetic motor or generator comprising one or more air gaps between the at least one rotor 1 and the at least one stator.

The electromagnetic motor or generator can preferably comprise at least one rotor 1 associated with two stators.

The invention claimed is:

1. A rotor (1) of a motor or generator having a body (2, 3) comprising an internal hub (2) concentric to a central axis of rotation (7) of the rotor (1), branches (3) extending radially in relation to the central axis of rotation (7) starting from the internal hub (2) toward a binding band (8) forming a circular external contour of the rotor (1), at least one magnet structure (10) with a plurality of magnets (4) being housed in each space delimited between two adjacent branches (3), the body (2, 3) being constituted by a plurality of layers of composite containing fibers bonded by a resin, whereby the layers are stacked and the fibers of each layer are oriented in different predetermined directions (F1, F2) for two stacked layers, a radial covering skin being located on each of the two opposite faces of the body (2, 3) of the rotor and being constituted by a plurality of stacked layers of composite containing fibers bonded by a resin and whereby the number of composite layers of the body (2, 3) is determined on the basis of an axial thickness of the magnet structure (10) and the covering skins have a thickness between 0.3 and 2 mm.

2. The rotor (1) according to claim 1, in which each magnet structure (10) has a width that increases with the distance from the internal hub (2), ending against the binding band (8) surrounding the rotor (1).

3. The rotor (1) according to claim 1, in which each unitary magnet (4) of the plurality of unitary magnets (4) of the magnet structure (10) is in the shape of a polygon or each unitary magnet (4) has an at least partly ovoid contour comprising a first portion forming the body of the unitary magnet (4) having a larger cross-section and extending over a greater length of the unitary magnet (4) than at least one second longitudinal extremity portion pointing toward an associated longitudinal extremity of the unitary magnet (4), the cross-section of which decreases as it approaches the longitudinal extremity.

4. An electromagnetic motor or generator with axial flux, characterized in that it comprises at least one rotor (1) according to claim 1, the electromagnetic motor or generator comprising at least one stator carrying at least one coil, the electromagnetic motor or generator comprising one or more air gaps between the at least one rotor (1) and the at least one stator.

5. A rotor (1) of a motor or generator having a body (2, 3) comprising an internal hub (2) concentric to a central axis of rotation (7) of the rotor (1), branches (3) extending radially in relation to the central axis of rotation (7) starting from the internal hub (2) toward a binding band (8) forming a circular external contour of the rotor (1), at least one magnet structure (10) with a plurality of magnets (4) being housed in each space delimited between two adjacent branches (3), the body (2, 3) being constituted by a plurality of layers of composite containing fibers bonded by a resin, whereby the layers are stacked and the fibers of each layer are oriented in different predetermined directions (F1, F2) for two stacked layers, a radial covering skin being located on each of the two opposite faces of the body (2, 3) of the rotor and being constituted by a plurality of stacked layers of composite containing fibers bonded by a resin whereby each branch (3) has a width that decreases as the distance from the internal hub (2) increases and ends in a tapered tip (3*b*) against the binding band (8) and in which the bases (3*a*) of two adjacent branches (3) are separated by an intermediate portion (9) of the internal hub (2), the intermediate portion (9) having a concave shape rounded toward the axis of the rotor (1), the internal hub (2) having a radius equal to at least one-quarter of a radius of the rotor (1).

6. A rotor (1) of a motor or generator having a body (2, 3) comprising an internal hub (2) concentric to a central axis of rotation (7) of the rotor (1), branches (3) extending radially in relation to the central axis of rotation (7) starting from the internal hub (2) toward a binding band (8) forming a circular external contour of the rotor (1), at least one magnet structure (10) with a plurality of magnets (4) being housed in each space delimited between two adjacent branches (3), the body (2, 3) being constituted by a plurality of layers of composite containing fibers bonded by a resin, whereby the layers are stacked and the fibers of each layer are oriented in different predetermined directions (F1, F2) for two stacked layers, a radial covering skin being located on each of the two opposite faces of the body (2, 3) of the rotor and being constituted by a plurality of stacked layers of composite containing fibers bonded by a resin in which each magnet structure (10) between two adjacent branches (3) is embedded in at least one layer of composite, the rotor (1) also being coated in at least one layer of composite surrounding the embedded magnet structures and the body (2) constituted by a plurality of layers of composite.

7. The rotor (1) according to claim 6, in which the fibers of a layer of composite of the body (2, 3) are oriented perpendicular to the fibers of an adjacent stacked layer of composite.

8. The rotor (1) according to claim 6, in which the fibers of a layer of composite of the body (2, 3) are oriented at an offset of 30° to 45° with respect to the fibers of an adjacent stacked layer of composite.

9. The rotor (1) according to claim 6, in which the layers of composite surrounding the rotor and constituting the hub (2) and the branches of the body (2, 3) are made of glass or carbon fibers cast in resin.

10. A method for the fabrication of a rotor (1) comprising a body (2, 3) constituted by a plurality of layers of composite containing fibers bonded by a resin, which method comprises the step of casting a first layer of composite, the fibers of the first layer being oriented in a single predetermined direction (F1), characterized by the steps of casting at least a second layer of composite stacked on the first layer of composite, the fibers of the second layer being oriented in a predetermined direction (F2) different from the direction (F1) of the first layer, and hardening of the resin in which the body (2, 3) comprises an internal hub (2) concentric to a central axis of rotation (7) of the rotor (1), branches (3) extending radially with respect to the central axis of rotation (7) starting from the internal hub (2) toward a binding band (8) forming a circular external contour of the rotor (1), the width of each branch (3) of the body (2, 3) of the hub (2) at a point along its length extending radially from the external periphery of the hub (2) to the internal periphery of the binding band (8) being determined on the basis of an allowable mechanical stress that can be applied to the rotor (1), an allowable maximum speed of rotation of the rotor (1) and a mechanical strength of the material of the branch (3), a decrease in the width of each branch (3) as the distance from the hub (2) increases being achieved by selecting for each branch (3) a width for each point along its length that ensures an iso-stress in the interior of the branch (3).

11. A rotor (1) of a motor or generator having a body (2, 3) comprising an internal hub (2) concentric to a central axis of rotation (7) of the rotor (1), branches (3) extending radially in relation to the central axis of rotation (7) starting from the internal hub (2) toward a binding band (8) forming a circular external contour of the rotor (1), at least one magnet structure (10) with a plurality of magnets (4) being housed in each space delimited between two adjacent branches (3), the body (2, 3) being constituted by a plurality of layers of composite containing fibers bonded by a resin, whereby the layers are stacked and the fibers of each layer are oriented in different predetermined directions (F1, F2) for two stacked layers, a radial covering skin (12) being located on each of the two opposite faces of the body (2, 3) of the rotor and being constituted by a plurality of stacked layers of composite containing fibers (13) bonded by a resin, in which each unitary magnet (4) of the plurality of unitary magnets (4) of the magnet structure (10) is in the shape of a polygon or each unitary magnet (4) has an at least partly ovoid contour comprising a first portion forming the body of the unitary magnet (4) having a larger cross-section and extending over a greater length of the unitary magnet (4) than at least one second longitudinal extremity portion pointing toward an associated longitudinal extremity of the unitary magnet (4), the cross-section of which decreases as it approaches the longitudinal extremity.

12. The rotor (1) according to claim 11, in which the plurality of unitary magnets (4) of a magnet structure (10) are connected together by a fiber-reinforced insulating material, each unitary magnet (4) having an elongated shape extending in the radial direction of the rotor (1).

13. The rotor (1) according to claim 11, in which each magnet structure (10) includes at least one mesh structure having mesh cells, each delimiting a housing for a respective unitary magnet (4), each housing having internal dimensions that are just sufficient to leave a space between the housing and the unitary magnet (4) filled by a fiber-reinforced resin after the introduction of a unitary magnet (4) into its interior, the mesh cells being made of a fiber-reinforced insulating material.

* * * * *